US006941029B1

(12) United States Patent
Hatori (10) Patent No.: US 6,941,029 B1
(45) Date of Patent: Sep. 6, 2005

(54) IMAGE PROCESSING APPARATUS, IMAGE PROCESSING METHOD, AND STORAGE MEDIUM THEREFOR WITH STITCHED IMAGE CORRECTIONAL FEATURE

(75) Inventor: Kenji Hatori, Ohta-ku (JP)

(73) Assignee: Canon Kabushiki Kaisha, (JP)

( * ) Notice: Subject to any disclaimer, the term of this patent is extended or adjusted under 35 U.S.C. 154(b) by 594 days.

(21) Appl. No.: 09/648,101

(22) Filed: Aug. 25, 2000

(30) Foreign Application Priority Data

Aug. 27, 1999 (JP) .................................. 11-241487

(51) Int. Cl.$^7$ ............................................. G06K 9/36

(52) U.S. Cl. ..................................................... 382/284

(58) Field of Search ........ 382/282–290; 358/450–453, 358/540; 348/584–599; 345/624–630, 418–421

(56) References Cited

U.S. PATENT DOCUMENTS

| | | | | |
|---|---|---|---|---|
| 5,680,150 A | * | 10/1997 | Shimizu et al. ............. | 358/540 |
| 5,721,624 A | * | 2/1998 | Kumashiro et al. ......... | 358/450 |
| 5,982,951 A | * | 11/1999 | Katayama et al. .......... | 382/284 |
| 6,148,118 A | * | 11/2000 | Murakami et al. .......... | 382/284 |
| 6,392,658 B1 | * | 5/2002 | Oura .......................... | 382/284 |
| 6,396,960 B1 | * | 5/2002 | Yoshimura ................... | 382/284 |

FOREIGN PATENT DOCUMENTS

JP         05342344 A    * 12/1993      ........... G06F 15/66

* cited by examiner

*Primary Examiner*—Jingge Wu
(74) *Attorney, Agent, or Firm*—Rossi, Kimms & McDowell, LLP

(57) ABSTRACT

An image processing apparatus is provided which is capable of carrying out resynthesis of images easily and without consuming much labor and time. An synthesized image is displayed on a display by an image synthesizing system, and a portion of the displayed synthesized image is designated using a mouse or a keyboard. The designated portion of the synthesized image is corrected by the image synthesizing system.

22 Claims, 7 Drawing Sheets

IMAGE PROCESSING APPARATUS, IMAGE PROCESSING METHOD, AND STORAGE MEDIUM THEREFOR WITH STITCHED IMAGE CORRECTIONAL FEATURE

BACKGROUND OF THE INVENTION

1. Field of the Invention

The present invention relates to an image processing apparatus and an image processing method, for synthesizing a plurality of images, and a storage medium storing a program for executing the image processing method.

2. Prior Art

Conventionally, there has been known an image synthesizing software which is capable of capturing a plurality of split images that have been shot with a digital camera or the like into a personal computer, and synthesizing them into a single panoramic image.

When a plurality of images having overlapping regions are joined together and synthesized into a single image, there may arise a dislocation or misalignment in part of the resulting synthesized image. In such a case, the conventional image synthesizing software cannot correct the synthesized image once it has been synthesized from a plurality of split images. Thus, in order to obtain a correctly synthesized image having no dislocation or misalignment, resynthesis of the images is required, that is, the split images have to be captured into the personal computer and synthesized again. This is very troublesome and time-consuming.

SUMMARY OF THE INVENTION

It is therefore an object of the present invention to provide an image processing apparatus and an image processing method, which are capable of carrying out resynthesis of images easily and without consuming much labor and time, and a storage medium storing a program for executing the image processing method.

To attain the above object, the present invention provides an image processing apparatus comprising display means for displaying a synthesized image, designation means for designating a portion of the synthesized image displayed by the display means, and correction means for correcting the portion of the synthesized image designated by the designation means.

With the above construction, a correction has only to be carried out only on a portion of the synthesized image by designating the portion of the synthesized image to be corrected. Thus, no resynthesis operation of the entire synthesized image is necessary. As a result, the correction of the synthesized image can be carried out easily and without consuming much labor and time.

Preferably, in the image processing apparatus according to the present invention, the portion of the synthesized image that is designated by the designation means is a joint portion of images, and the correction means corrects the synthesized image by carrying out resynthesis operation of images at the designated joint portion.

Preferably, the image processing apparatus according to the present invention comprises input means for inputting relative positions of images to be joined together at the designated joint portion, and the correction means corrects the synthesized image by carrying out resynthesis of the images to be joined together based on the input relative positions. As a result, designation of relative positions of images joined together at the designated joint portion can be performed easily.

Also preferably, in the image processing apparatus according to the present invention, the input means has an image moving function of individually moving the images to be joined together at the designated joint portion on the display means, and the input means inputs the relative positions of the images to be joined together at the designated joint portion by moving and superimposing the images using the image moving function. As a result, relative positioning of images to be joined together can be accomplished easily.

Preferably, in the image processing apparatus according to the present invention, the input means has a corresponding position inputting function of inputting respective corresponding positions for the images to be joined together at the designated joint portion, and the input means inputs the relative positions of the images to be joined together at the designated joint portion by inputting the corresponding positions for the images using the corresponding position inputting function. As a result, relative positioning of images to be joined together can be accomplished easily and accurately.

Also preferably, in the image processing apparatus according to the present invention, the input means has a first relative position inputting function of inputting the relative positions of the images to be joined together at the designated joint portion by individually moving and superimposing the images to be joined together at the designated joint portion on the display means, and a second relative position inputting function of designating relative positions of the images to be joined together at the designated joint portion by designating respective superimposing positions for the images to be joined together at the designated joint portion. The input means includes means for selecting between the first relative position inputting function and the second relative position inputting function as desired. With this construction, the process for designating relative positions of images to be joined together at the designated joint portion can be selected according to the status of relative positions of images so that relative positioning of images can be accomplished easily and accurately.

The image processing apparatus according to the present invention preferably comprises display control means for controlling the display means such that the joint portion of the synthesized image is displayed on the display means in a specifiable manner. As a result, designation of the joint portion can be carried out easily.

Also preferably, in the image processing apparatus according to the present invention, the display control means controls the display means such that a frame enclosing the joint portion on the synthesized image is displayed on the display means in superposition upon the synthesized image.

Further preferably, the image processing apparatus according to the present invention comprises operation aid means for displaying at least one of a written instruction and an animation explaining an operating method concerning correction of the synthesized image on the display means, when the portion of the synthesized image is corrected by the correction means. As a result, the operating environment can be improved by assisting a user in the correction of synthesized images.

To attain the above object, the present invention also provides an image processing method comprising the steps of displaying a synthesized image on display means, designating a portion of the synthesized image displayed on the display means, and correcting the designated portion of the synthesized image.

With the above construction, a correction has only to be carried out only on a portion of the synthesized image by designating the portion of the synthesized image to be corrected. Thus, no resynthesis operation of the entire synthesized image is necessary. As a result, the correction of the synthesized image can be carried out easily and without consuming much labor and time.

Preferably, in the image processing method according to the present invention, the portion of the synthesized image designated by the designating step is a joint portion of images, and the correction step corrects the synthesized image by carrying out resynthesis of images at the designated joint portion.

Preferably, the image processing method according to the present invention comprises an input step of inputting relative positions of the images to be joined together at the designated joint portion, and the correction step corrects the synthesized image by carrying out resynthesis of the images to be joined together based on the input relative positions. As a result, designation of relative positions of images joined together at the designated joint portion can be performed easily.

Preferably, in the image processing method according to the present invention, the input step comprises inputting the relative positions of the images to be joined together at the designated joint portion by individually moving the images to be joined together at the designated joint portion on the display means and superimposing the images. As a result, relative positioning of images to be joined together can be accomplished easily.

Also preferably, in the image processing method according to the present invention, the input step comprises inputting the relative positions of the images to be joined together at the designated joint portion by inputting respective corresponding positions for the images. As a result, relative positioning of images to be joined together can be accomplished easily and accurately.

Preferably, the input step includes a selection step of selecting a first relative position inputting function of inputting the relative positions of the images to be joined together at the designated joint portion by individually moving and superimposing the images to be joined together at the designated joint portion on the display means, or a second relative position inputting function of designating relative positions of the images to be joined together at the designated joint portion by designating respective superimposing positions for the images to be joined together at the designated joint portion, and the input step inputs the relative positions of the images to be joined together at the designated joint portion using the selected relative position inputting function. With this construction, the process for designating relative positions of images to be joined together at the designated joint portion can be selected according to the status of relative positions of images so that relative positioning of images can be accomplished easily and accurately.

Preferably, the image processing method according to the present invention comprises a display control step of controlling the display means such that the joint portion of the synthesized image is displayed on the display means in a specifiable manner. As a result, designation of the joint portion can be carried out easily.

Preferably, in the image processing method according to the present invention, the display control step comprises controlling the display means such that a frame enclosing the joint portion of the synthesized image is displayed on the display means in superposition upon the synthesized image.

Also preferably, the image processing method according to the present invention comprises an operation aid step of displaying at least one of a written instruction and an animation explaining an operating method concerning correction of the synthesized image on the display means, when the portion of the synthesized image is corrected by the correction step. As a result, the operating environment can be improved by assisting a user in the correction of synthesized images.

To attain the above object, the present invention also provides a machine readable storage medium storing a program for constructing an image processing system, the program comprising a synthesized image display control module for displaying a synthesized image on display means, a designation module for designating a portion of the synthesized image displayed on the display means, and a correction module for correcting the designated portion of the synthesized image.

With the above construction, a correction has only to be carried out only on a portion of the synthesized image by designating the portion of the synthesized image to be corrected. Thus, no resynthesis operation of the entire synthesized image is necessary. As a result, the correction of the synthesized image can be carried out easily and without consuming much labor and time.

Preferably, in the storage medium according to the present invention, the portion of the synthesized image designated by the designation module is a joint portion of images, and the correction module corrects the synthesized image by carrying out resynthesis of images at the designated joint portion.

Also preferably, the program in the storage medium comprises an input module for inputting relative positions of the images to be joined together at the designated joint portion, and the correction module corrects the synthesized image by carrying out resynthesis of the images to be joined together based on the input relative positions. As a result, designation of relative positions of images joined together at the designated joint portion can be performed easily.

Preferably, in the storage medium according to the present invention, the input module has an image moving function of individually moving the images to be joined together at the designated joint portion on the display means, and the input module inputs the relative positions of the images to be joined together at the designated joint portion by moving and superimposing the images using the image moving function. As a result, relative positioning of images to be joined together can be accomplished easily.

Preferably, in the storage medium according to the present invention, the input module has a corresponding position inputting function of inputting respective corresponding positions for the images to be joined together at the designated joint portion, and the input module inputs the relative positions of the images to be joined together at the designated joint portion by inputting the corresponding positions for the images using the corresponding position inputting function. As a result, relative positioning of images to be joined together can be accomplished easily and accurately.

Further preferably, in the storage medium according to the present invention, the input module selects and executes a function from a first relative position inputting function of inputting the relative positions of the images to be joined together at the designated joint portion by individually moving and superimposing the images to be joined together at the designated joint portion on the display means, and a second relative position inputting function of designating relative positions of the images to be joined together at the designated joint portion by designating respective superimposing positions for the images to be joined together at the designated joint portion. With this construction, the process for designating relative positions of images to be joined together at the designated joint portion can be selected according to the status of relative positions of images so that relative positioning of images can be accomplished easily and accurately.

Preferably, in the storage medium according to the present invention, the display control module controls the display means such that the joint portion of the synthesized image is displayed on the display means in a specifiable manner. As a result, designation of the joint portion can be carried out easily.

Also preferably, the display control module controls the display means such that a frame enclosing the joint portion of the synthesized image is displayed on the display means in superposition upon the synthesized image.

Preferably, the program in the storage medium further comprises an operation aid module for displaying at least one of a written instruction and an animation explaining an operating method concerning correction of the synthesized image on the display means, when the correction module corrects the portion of the synthesized image. As a result, the operating environment can be improved by assisting a user in the correction of synthesized images.

The above and other objects, features, and advantages of the invention will become more apparent from the following detailed description taken in conjunction with the accompanying drawings.

DETAILED DESCRIPTION OF PREFERRED EMBODIMENT

The present invention will now be described with reference to drawings showing an embodiment thereof.

Figure 1:
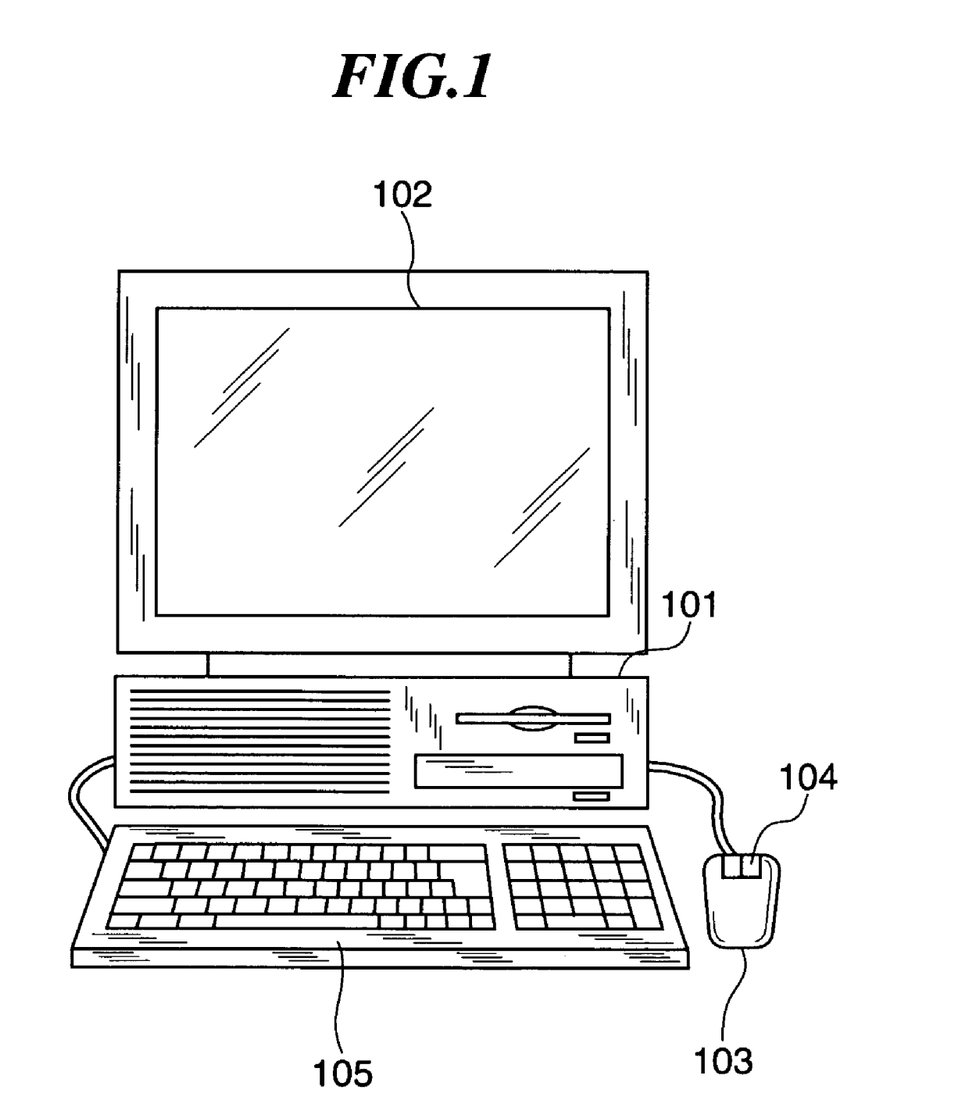
FIG. 1 is a view showing the external appearance of a personal computer constituting an image processing apparatus according to an embodiment of the present invention.
Figure 2:
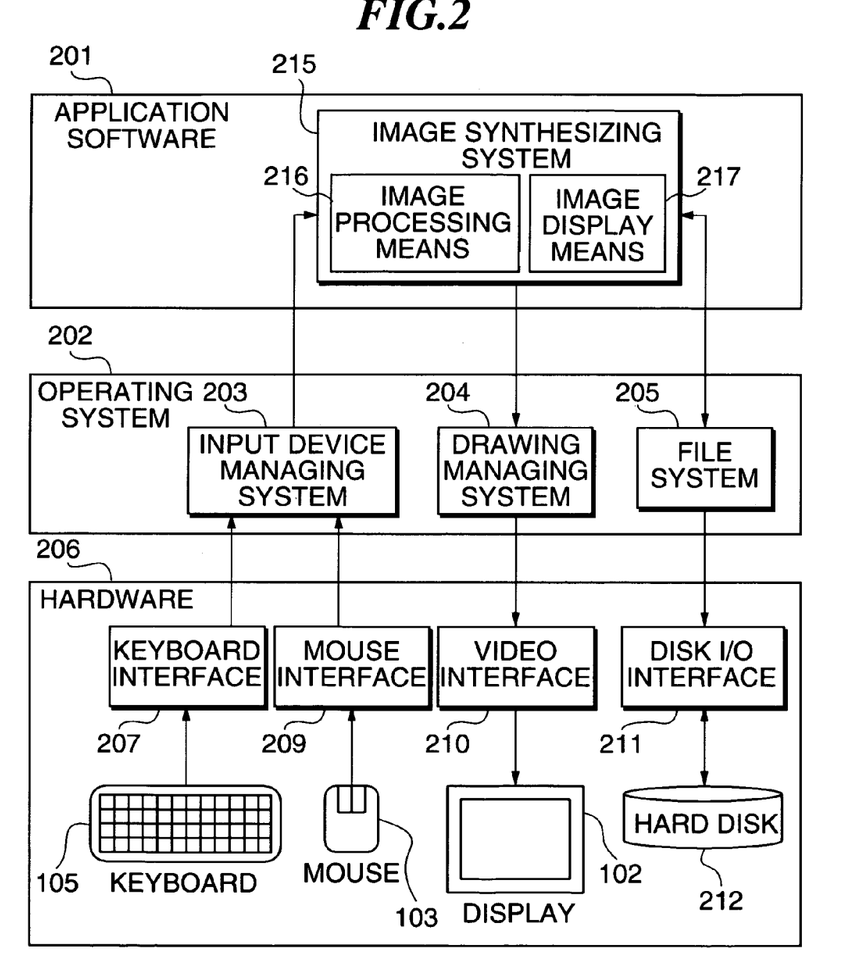
FIG. 2 is a block diagram showing the construction of an image synthesizing system 215 configured on the personal computer of FIG. 1.

FIG. 1 is a view showing the external appearance of a personal computer constituting an image processing apparatus according to an embodiment of the present invention. FIG. 2 is a block diagram showing the construction of an image synthesizing system 215 configured on the personal computer of FIG. 1.

The personal computer constituting the image processing apparatus is comprised of a personal computer main body 101, a display 102, a mouse 103 including mouse-buttons 104, and a keyboard 105, as shown in FIG. 1.

The personal computer is composed of hardware 206, an operating system (hereinafter referred to as the OS) 202 that operates on the hardware 206, and application software 201 that operates on the OS 202, as shown in FIG. 2.

The hardware 206 includes a keyboard interface 207 that interfaces with the keyboard 105, a mouse interface 209 that interfaces with the mouse 103, a video interface 210 that interfaces with the display 102, a disk I/O interface 211 that interfaces with a hard disk 212, a CPU (not shown), and so forth.

The OS 202 includes an input device managing system 203, a drawing managing system 204, and a file system 205. The input device managing system 203 receives input from the keyboard 105 via the keyboard interface 207, and input from the mouse 103 via the mouse interface 209, and sends the received input to an image synthesizing system 215 in the application software 201. The drawing managing system 204 receives image data from the image synthesizing system 215, and sends the received image data to the display 102 via the video interface 210. The drawing managing system 204 operates in response to drawing instructions sent from various application software, not shown, to display various kinds of information on the display 102. The file system 205 carries out write-read operations on data to and from the hard disk 212 via the disk I/O interface 211, and sends the readout data to the image synthesizing system 215.

The application software 201 is for constructing the above-mentioned image synthesizing system 215. The image synthesizing system 215 constructed by this software includes an image processing means 216 that executes various image processing for synthesizing a plurality of images read out from the hard disk 212, and an image display processing means 217 for displaying the synthesized image on the display 102 as well as displaying operating screens for the image synthesis, correction processing, etc. The image processing means 216 has the function of correcting the synthesized image, and corrects the synthesized image using this function by designating a joint portion of the synthesized image that is displayed on the display 102 based on input operation of the mouse 103 or the keyboard 105, and carrying out resynthesis of images joined together at the designated joint portion. The image display processing means 217 controls the display 102 such that, when correcting the synthesized image, the joint portion of the synthesized image is displayed in a manner being enclosed by a frame on the display 102.

Figure 3:
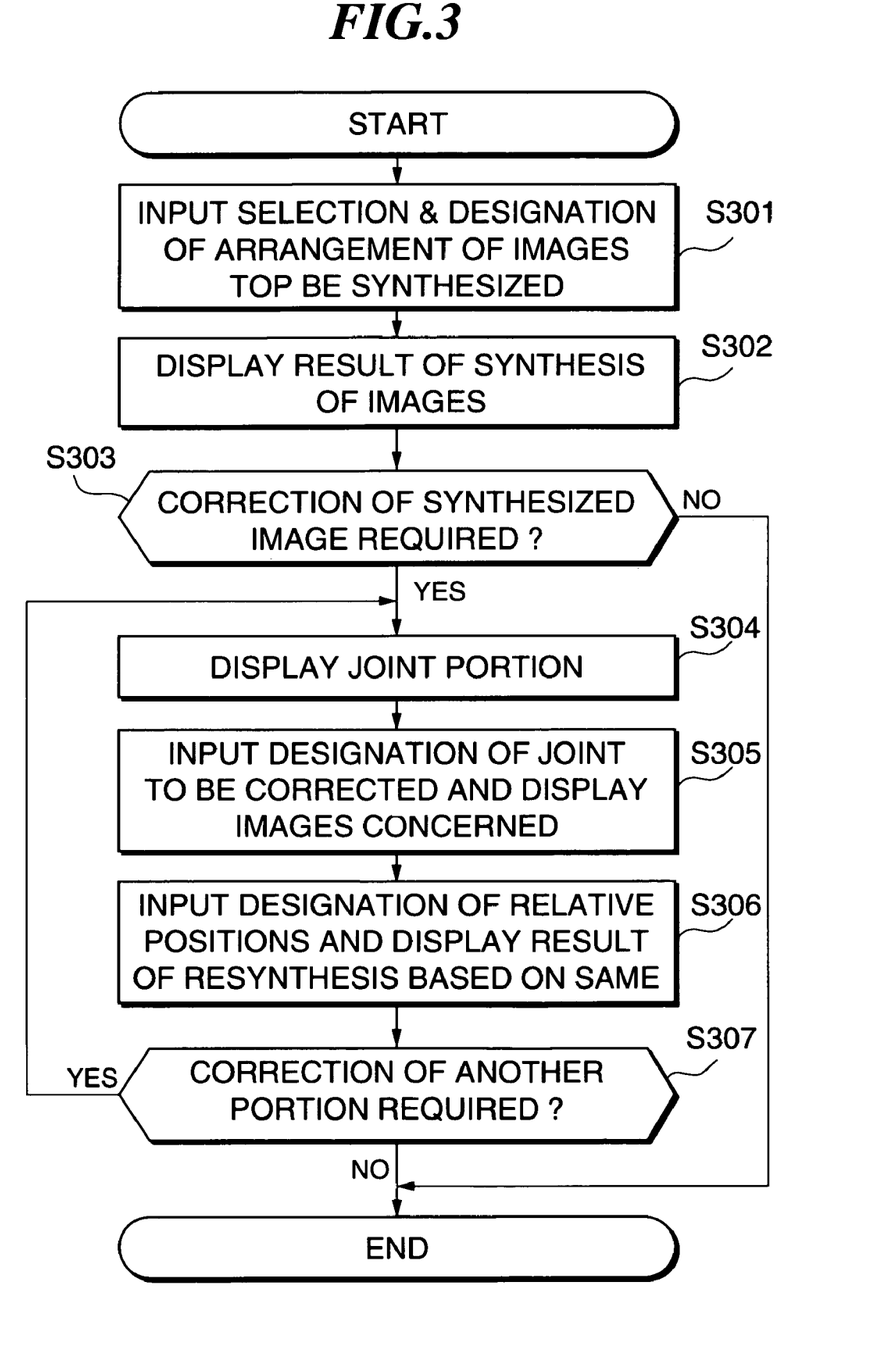
FIG. 3 is a flow chart showing a flow of operation carried out by the image synthesizing system 215 of FIG. 2.
Figure 4:
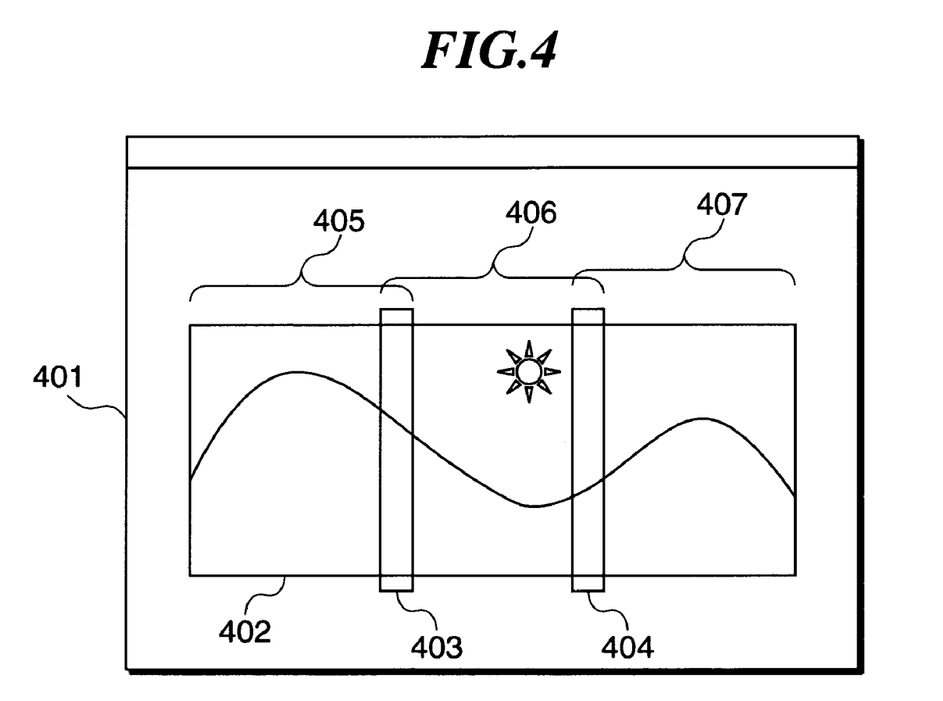
FIG. 4 is a view showing an example of joint portions of images in a synthesized image displayed in step S304 of FIG. 3.
Figure 5:
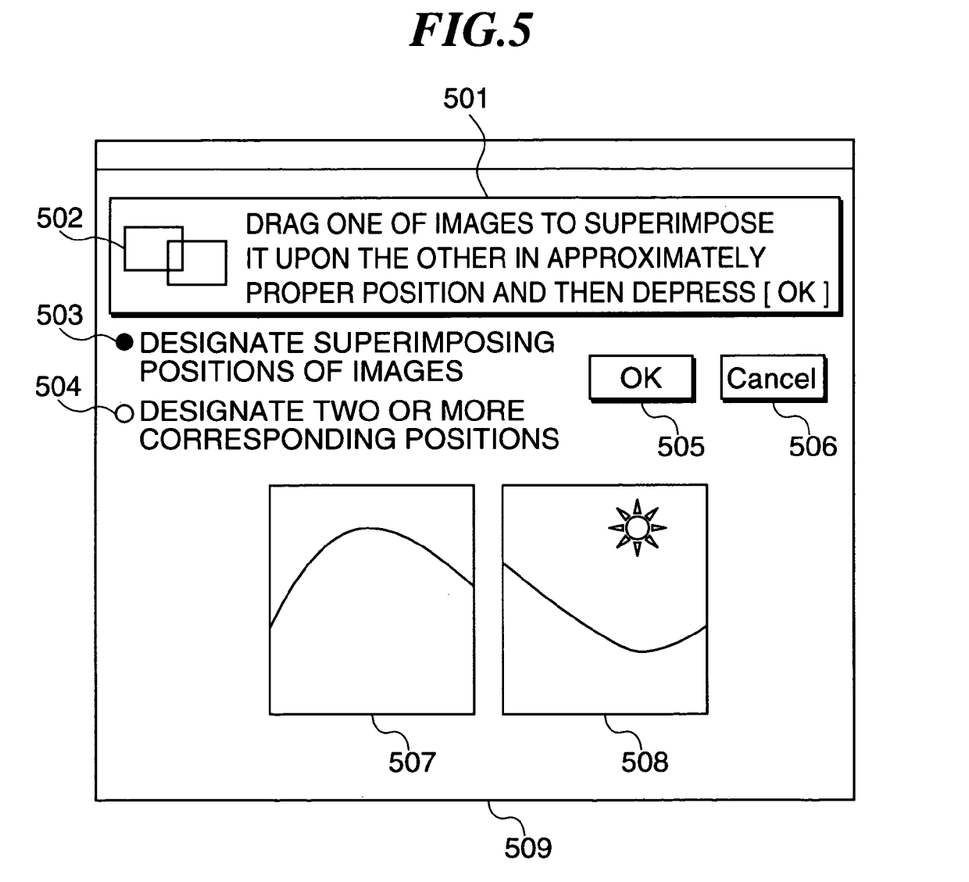
FIG. 5 is a view showing an example of a window in which images to be joined together at a designated portion are displayed in step S305 of FIG. 3.
Figure 6:
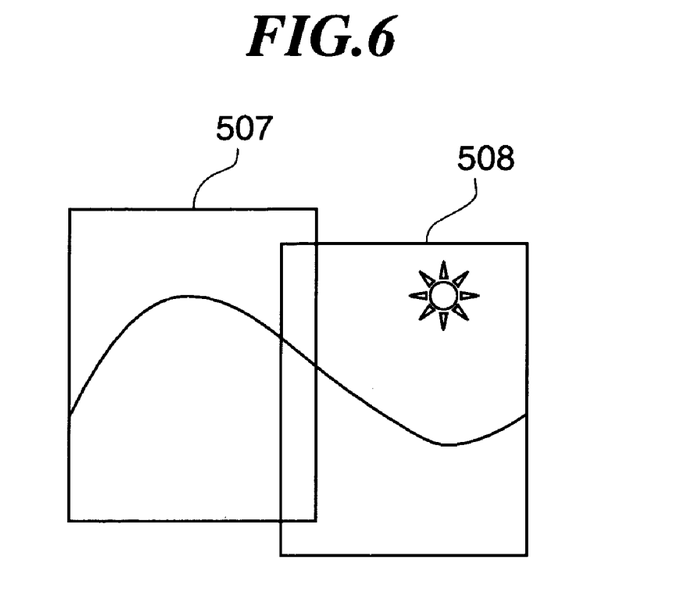
FIG. 6 is a schematic view useful in explaining a first relative position designating process that can be selected in step S305 of FIG. 3.
Figure 7:
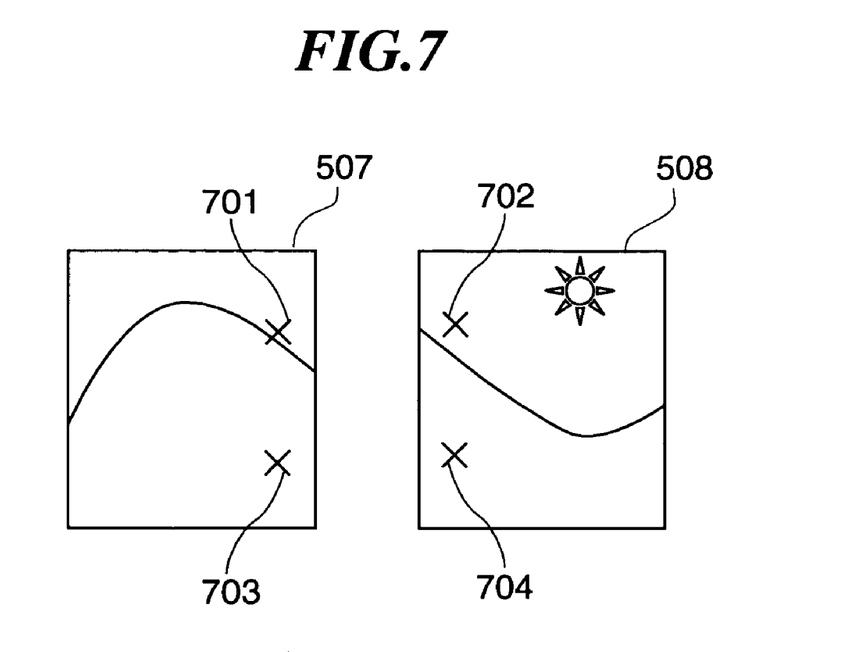
FIG. 7 is a schematic view useful in explaining a second relative position designating process that can be selected in step S305 of FIG. 3.
Figure 8:
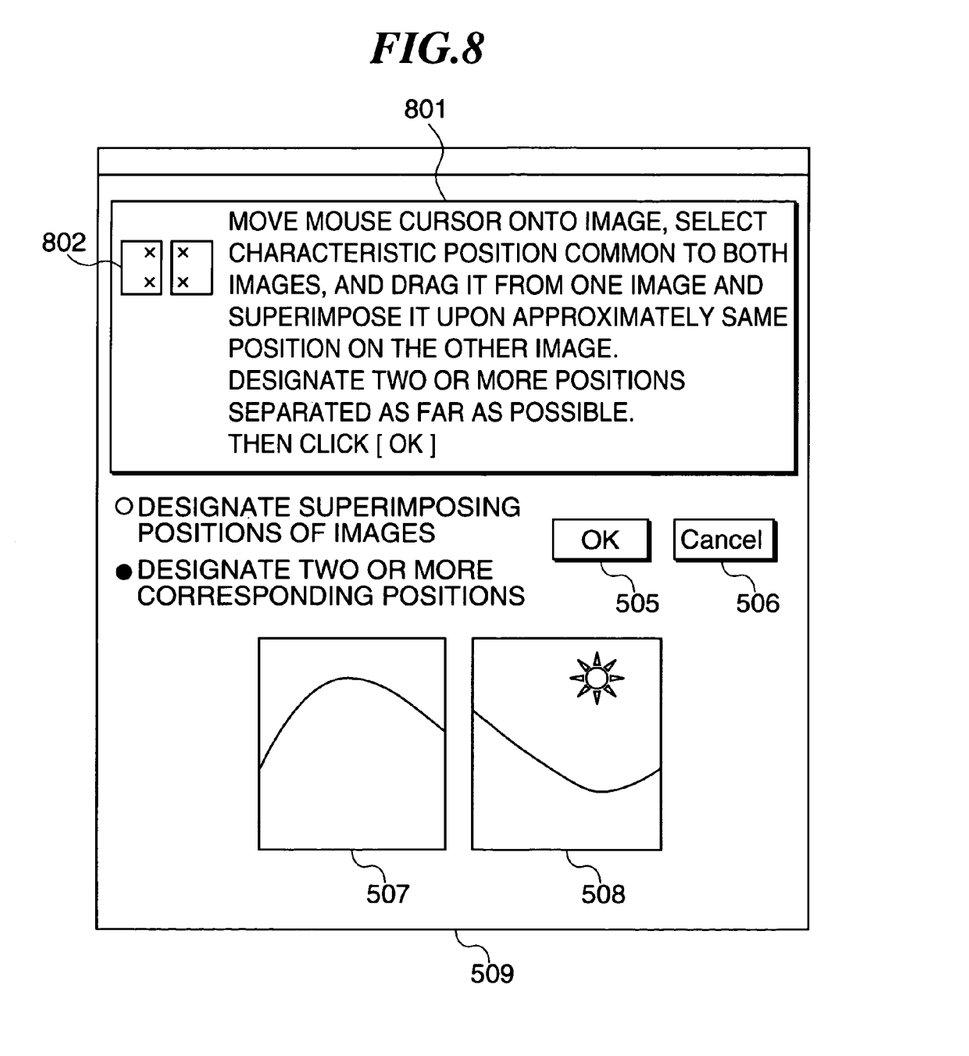
FIG. 8 is a view showing an operation aid window switched from an operation aid window in FIG. 5.

Next, the operation of the image synthesizing system 215 will be described with reference to FIGS. 3 through 8. FIG. 3 is a flow chart showing a flow of operation carried out by the image synthesizing system 215 of FIG. 2. FIG. 4 is a view showing an example of joint portions of images in a synthesized image displayed in step S304 of FIG. 3. FIG. 5 is a view showing an example of a window in which images to be joined together at a designated portion are displayed in step S305 of FIG. 3. FIG. 6 is a schematic view useful in explaining a first relative position designating process that can be selected in step S305 of FIG. 3. FIG. 7 is a schematic view useful in explaining a second relative position designating process that can be selected in step S305 of FIG. 3. FIG. 8 is a view showing an operation aid window switched from an operation aid window in FIG. 5.

In the image synthesizing system 215, as shown in FIG. 3, first in step S301, selection and designation of arrangement of images to be synthesized are input by a user. Here, images to be synthesized are split images which are separately shot beforehand with a digital camera and stored in the hard disk 212. Thus, from images stored in the hard disk 212, the user selects a plurality of images to be synthesized, and designates arrangement of the selected images.

Then, the process proceeds to a step S302, where the selected images are synthesized by the image processing means 216 in an arrangement corresponding to the arrangement designated by the user, and the synthesized image is displayed on the display 102 by the image display processing means 217.

In the following step S303, it is determined whether the synthesized image displayed on the display 102 is to be corrected or not, based on the user's instructions. The user checks the synthesized image displayed on the display 102 to determine whether the result of the synthesis is satisfactory or not. If the synthesized image is not satisfactory because of a dislocation or misalignment (error) in a part of the synthesized image, the user issues a correction command for correcting the part of the synthesized image. If the correction command is issued, the image synthesizing system 215 judges that correction of the synthesized image has to be carried out, and the process proceeds to a step S304. If the correction command is not issued by the user, the present process is terminated.

In the step S304, joint portions of images in the synthesized image that is displayed on the display 102 are displayed in a specifiable manner. For example, as shown in FIG. 4, frames enclosing the joint portions of images in the synthesized image are also displayed in superposition upon the synthesized image. In the illustrated example, a synthesized image 402 that is obtained by synthesizing three images 405, 406, and 407 is displayed in a window 401 in such a manner that joint portions 403, 404 of the images 405, 406 and 407 in the synthesized image 402 are enclosed by the frames. The joint portion 403 is a joint between the images 405 and 406, and the joint portion 404 is a joint between the images 406 and 407. When synthesizing images, an averaging process is usually performed in which pixels in the joint portion of images are weighted and averaged such that the boundary of images cannot become perceivably distinct.

Then, the process proceeds to a step S305, where designation of a joint portion is input by the user, and based on the input designation of the joint portion, the images joined together at the corresponding joint portion are displayed in the window. For example, if there is a dislocation in the joint portion 403 in the synthesized image 402 that is displayed in the window 401 in FIG. 4, the joint portion 403 is designated by the user's input operation of the mouse 103 or the keyboard 105. When the joint portion 403 is designated, as shown in FIG. 5, images 507, 508 joined together at the joint portion 403 (which correspond to the images 405, 406 in FIG. 4) are displayed in a window 509.

The window 509 includes buttons 503, 504 for switching correction methods for correcting a dislocation at the designated joint portion 403, a button 505 ("OK" button) for instructing the start of the synthesis of images displayed, and a button 506 ("Cancel" button) for closing the window 509 without executing the resynthesis. The button 503 is for selecting a process of individually moving the displayed images 507, 508 to be joined together and superimposing them on the screen in response to operation of the mouse 103 or the keyboard 105. If this process is selected by operating the button 503, relative positions of the images 507, 508 with respect to each other can be designated by individually moving and superimposing them on the screen. Specifically, when this process is selected by operating the button 503, as shown in FIG. 6 for example, one of the images 507, 508 is moved relative to the other, and is superimposed upon the other so as to obtain proper relative positions of the images. When proper relative positions have been obtained, the button 505 is depressed. The relative positions of the images 507, 508 are thus designated and a start command is issued for starting the synthesis of images 507, 508. In this way, relative positioning of the images can be accomplished easily by simple operation.

On the other hand, the button 504 is for selecting a process of designating a plurality of corresponding positions respectively for the images 507 and 508 in response to operation of the mouse 103 or the keyboard 105. If this process is selected by operating the button 504, relative positions of the images 507, 508 with respect to each other can be designated by designating a plurality of corresponding positions respectively for the images 507 and 508. Specifically, when this process is selected by operating the button 504, as shown in FIG. 7 for example, superimposing positions are designated for the images 507 and 508, respectively, by the operation of the mouse 103 or the keyboard 105. In FIG. 7, a position 701 is designated for the image 507, and a position 702 is designated for the image 508 as a position on the image 508 corresponding to the position 701 on the image 507. Similarly, a position 703 is designated for the image 507, and a position 704 is designated for the image 508 as a position on the image 508 corresponding to the position 703 on the image 507. The designated positions 701 to 704 can be indicated by a symbol "X" as shown in the illustrated example. It is to be understood that the symbol indicating the position is not limited to "X", but any other symbol, for example, a symbol "O" may be used. Although two positions are designated for each image in this example, more than two positions may be designated for each image. Thus, in this process, relative positioning of images can be accomplished more accurately, especially in the case where at least one of the images is rotated, than the process that is selected by the above-mentioned button 503. When proper designation of positions has been carried out, the button 505 is depressed. The relative positions of images 507, 508 with respect to each other are thus designated and the start command is issued for starting the synthesis of the images 507, 508.

As shown in FIG. 5, the window 509 includes an operation aid window 501. In this operation aid window 501, a written instruction explaining the operating method for the process selected by each of the buttons 503, 504 and an animation 502 illustrating the same are displayed. In the illustrated example, the button 503 is selected so that the written instruction and animation illustrating the operating method concerning the process selected by the button 503 are displayed. On the other hand, when the button 504 is selected, the operation aid window 501 is switched to an operation aid window 801 for the process selected by the button 504, as shown in FIG. 8. In the operation aid window 801, a written instruction and an animation 802 illustrating the operating method concerning the process selected by the button 504 are displayed.

When relative positions of images to be joined together at the designated joint portion have thus been designated, the process proceeds to a step S306, where the designated relative positions of images are input, and based on the input relative positions, the synthesis of images to be joined together at the designated joint portion is carried out again and the resulting synthesized image is displayed on the display 102.

Then, the process proceeds to a step S307, where it is determined whether the synthesized image that is displayed on the display 102 after correction should be corrected again or not, depending on instructions by the user. Here, the user checks the synthesized image after correction that is displayed on the display 102 to determine whether the result of synthesis is satisfactory or not. If the synthesized image is not satisfactory because of an error in a part of the synthesized image after correction, the user issues a correction command for correcting the part of the synthesized image. Upon receipt of this correction command, the image synthesizing system 215 judges that the synthesized image has to be corrected again, and the process returns to the above-mentioned step S304, where the joint portion is displayed again. If the user finds the synthesized image after correction to be satisfactory and does not issue another correction command, the present process is terminated.

As described above, in the present embodiment, the synthesized image displayed on the display 102 is checked by the user, and if occurrence of an error such as a dislocation or misalignment at a joint portion is found, the joint portion where the error has occurred is designated by the user's operation of the mouse 103 or the keyboard 105. Then, correction of the synthesized image is carried out by automatically carrying out again the synthesis of images to be joined at the designated joint portion. Thus, resynthesis of images can be carried out easily and without consuming much labor and time.

Further, each of the joint portions of the synthesized image may be designated for correction to resynthesize an image at the designated joint portion. This is very effective in the case where there are two or more joint portions (i.e. three or more images are synthesized), because it suffices to carry out a calculation process required for resynthesis only for a portion or portions of the synthesized image desired to be corrected, while results of calculations so far carried out may be used for a portion or portions not required to be corrected, thus enabling a reduction in the amount of calculation as compared with the case where the resynthesis is carried out on the entire synthesized image.

When correcting the synthesized image, the joint portion of the synthesized image is displayed in a manner being enclosed by a frame so that designation of the corresponding joint portion can be carried out easily and accurately.

Moreover, the process for designating relative positions of images to be joined together at the designated joint portion can be selected according to the status of relative positions of images so that relative positioning of images can be accomplished easily and accurately.

In addition, the operating method concerning the process for designating relative positions of images to be joined at the designated joint portion is displayed on the display 102. Therefore, the user's operation can be aided to thereby improve the operating environment.

Although in the present embodiment various blocks are constructed on the same machine, it is also possible to construct various parts using computers and processing apparatuses distributed over a network.

In the present embodiment, the image processing apparatus is constructed using a personal computer. However, it is also possible to construct a dedicated image processing apparatus.

The processes implemented by software in the present embodiment may be executed by a hardware circuit.

It is to be understood that the present invention may also be realized by supplying a system or an apparatus with a storage medium stores the program code of software that realizes the functions of the processes (including, for example, the process shown by the flow chart of FIG. 3) of the present embodiment, and causing a computer (or CPU, MPU) of the system or apparatus to read out and execute the program code stored in the storage medium.

In this case, the program code itself read out from the storage medium realizes the above described functions of the present embodiment, so that the storage medium storing the program code also constitutes the present invention.

The storage medium for supplying the program code may be selected, for example, from a floppy disk, hard disk, optical disk, magneto-optical disk, CD-ROM, CD-R, magnetic tape, non-volatile memory card, and ROM.

It is to be understood that the functions of the above described embodiment may be accomplished not only by executing a program code read out by a computer, but also by causing an operating system (OS) that operates on the computer to perform a part or the whole of the actual operations according to instructions of the program code.

Furthermore, the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiment.

What is claimed is:

1. An image processing apparatus comprising:
   display means for displaying an image synthesized from a plurality of images;
   display control means for automatically controlling said display means to display at least one joint portion of the synthesized image on said display means;
   designation means for designating the at least one joint portion of said synthesized image displayed on said display means; and
   correction means for correcting the designated joint portion of the synthesized image, wherein said correction means corrects said synthesized image by carrying out resynthesis of images at the designated joint portion.

2. An image processing apparatus according to claim 1, further comprising input means for inputting relative positions of images to be joined together at said designated joint portion.

3. An image processing apparatus according to claim 2, wherein said input means has an image moving function of individually moving said images to be joined together at said designated joint portion on said display means, said input means inputting said relative positions of said images to be joined together at said designated joint portion by moving and superimposing said images using said image moving function.

4. An image processing apparatus according to claim 2, wherein said input means has a corresponding position inputting function of inputting respective corresponding positions for said images to be joined together at said designated joint portion, said input means inputting said relative positions of said images to be joined together at said designated joint portion by inputting said corresponding positions for said images using said corresponding position inputting function.

5. An image processing apparatus according to claim 2, wherein said input means has a first relative position inputting function of inputting said relative positions of said images to be joined together at said designated joint portion by individually moving and superimposing said images to be joined together at said designated joint portion on said display means, and a second relative position inputting function of designating relative positions of said images to be joined together at said designated joint portion by designating respective superimposing positions for said images to be joined together at said designated joint portion, said input means including means for selecting between said first relative position inputting function and said second relative position inputting function as desired.

6. An image processing apparatus according to claim 1, wherein said display control means controls said display means such that at least one of frames enclosing a corresponding joint portion of said synthesized images is displayed on said display means in superposition upon said synthesized image.

7. An image processing apparatus according to claim 1, further comprising operation aid means for displaying at least one of a written instruction and an animation explaining an operating method concerning correction of said synthesized image on said display means, when said designated joint portion of said synthesized image is corrected by said correction means.

8. An image processing method comprising the steps of:
displaying an image synthesized from a plurality of images on display means;
controlling automatically said display means to display at least one joint portion of the synthesized image on said display means;
designating the at least one joint portion of said synthesized image displayed on said display means;
correcting the designated joint portion of the synthesized image, wherein correcting the synthesized image by carrying out resynthesis of images at the designated joint portion.

9. An image processing method according to claim 8, further comprising an input step of inputting relative positions of images to be joined together at said designated joint portion.

10. An image processing method according to claim 9, wherein said input step comprises inputting said relative positions of said images to be joined together at said designated joint portion by individually moving said images to be joined together at said designated joint portion on said display means and superimposing said images.

11. An image processing method according to claim 9, wherein said input step comprises inputting said relative positions of said images to be joined together at said designated joint portion by inputting respective corresponding positions for said images.

12. An image processing method according to claim 9, wherein said input step includes a selection step of selecting a first relative position inputting function of inputting said relative positions of said images to be joined together at said designated joint portion by individually moving and superimposing said images to be joined together at said designated joint portion on said display means, or a second relative position inputting function of designating relative positions of said images to be joined together at said designated joint portion by designating respective superimposing positions for said images to be joined together at said designated joint portion, said input step inputting said relative positions of said images to be joined together at said designated joint portion using the selected relative position inputting function.

13. An image processing method according to claim 8, wherein said display control step comprises controlling said display means such that at least one of frames enclosing a corresponding joint portion of said synthesized images is displayed on said display means in superposition upon said synthesized image.

14. An image processing method according to claim 8, further comprising an operation aid step of displaying at least one of a written instruction and an animation explaining an operating method concerning correction of said synthesized image on said display means, when said designated joint portion of said synthesized image is corrected by said correction step.

15. A machine readable storage medium storing a program for constructing an image processing system, said program comprising:
a synthesized image control module for displaying an image synthesized from a plurality of images on display means and for controlling said display means to display at least one joint portion of said synthesized image on said display means;
a designation module for designating the at least one joint portion of said synthesized image displayed on said display means; and
a correction module for correcting the designated joint portion of the synthesized image, wherein said correction modle corrects said synthesized image by carrying out resynthesis of images at the designated joint portion.

16. A machine readable storage medium according to claim 15, further including an input module for inputting relative positions of images to be joined together at said designated joint portion.

17. A machine readable storage medium according to claim 16, wherein said input module has an image moving function of individually moving said images to be joined together at said designated joint portion on said display means, said input module inputting said relative positions of said images to be joined together at said designated joint portion by moving and superimposing said images using said image moving function.

18. A machine readable storage medium according to claim 16, wherein said input module has a corresponding position inputting function of inputting respective corresponding positions for said images to be joined together at said designated joint portion, said input module inputting said relative positions of said images to be joined together at said designated joint portion by inputting said corresponding positions for said images using said corresponding position inputting function.

19. A machine readable storage medium according to claim 16, wherein said input module selects and executes a function from a first relative position inputting function of inputting said relative positions of said images to be joined together at said designated joint portion by individually moving and superimposing said images to be joined together at said designated joint portion on said display means, and a second relative position inputting function of designating relative positions of said images to be joined together at said designated joint portion by designating respective superimposing positions for said images to be joined together at said designated joint portion.

20. A machine readable storage medium according to claim 15, wherein said synthesized image control module controls said display means such that at least one of frames enclosing a corresponding joint portion of said synthesized images is displayed on said display means in superposition upon said synthesized image.

21. A machine readable storage medium according to claim 15, further including an operation aid module for displaying at least one of a written instruction and an animation explaining an operating method concerning correction of said synthesized image on said display means, when said designated joint portion of said synthesized image is corrected by said correction module.

22. An image processing apparatus comprising:

display control means for displaying an image synthesized from a plurality of images on a display and for displaying at least one joint portion of the synthesized image on said display;

designation means for designating the at least one joint portion of said synthesized image displayed on said display; and correction means for correcting the joint portion of the synthesized image designated by said designation means, wherein said correction means corrects said synthesized image by carrying out resynthesis of images at the designated joint portion.

* * * * *